J. & A. GRAHAM.
FLUID PRESSURE VALVE.
APPLICATION FILED DEC. 15, 1913.

1,217,747.

Patented Feb. 27, 1917.

Witnesses:
Walter P. Pullinger
Ada E. Powell

Inventors.
John Graham and Archibald Graham
by their Attorneys
Howson & Howson

UNITED STATES PATENT OFFICE.

JOHN GRAHAM AND ARCHIBALD GRAHAM, OF GLASGOW, SCOTLAND.

FLUID-PRESSURE VALVE.

1,217,747. Specification of Letters Patent. Patented Feb. 27, 1917.

Application filed December 15, 1913. Serial No. 806,872.

*To all whom it may concern:*

Be it known that we, JOHN GRAHAM and ARCHIBALD GRAHAM, subjects of the King of Great Britain and Ireland, and residents of Glasgow, Scotland, engineers, have invented new and useful Improvements in Fluid-Pressure Valves, of which the following is a specification.

This invention has reference to and comprises improvements in fluid pressure valves, such as pressure reducing valves of the class having two valve faces and two corresponding valve seats controlling the passage of pressure fluid from the under to the upper side of the valve, and the object of the invention is to prevent the passage of steam or pressure fluid except by the two orifices controlled by the duplex faced valve.

Figure 1:
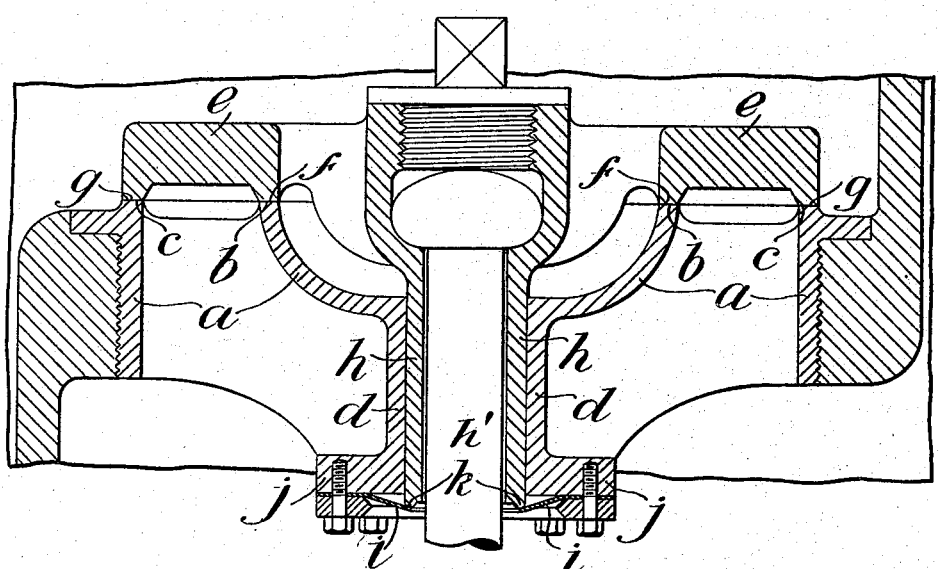
Figure 2:
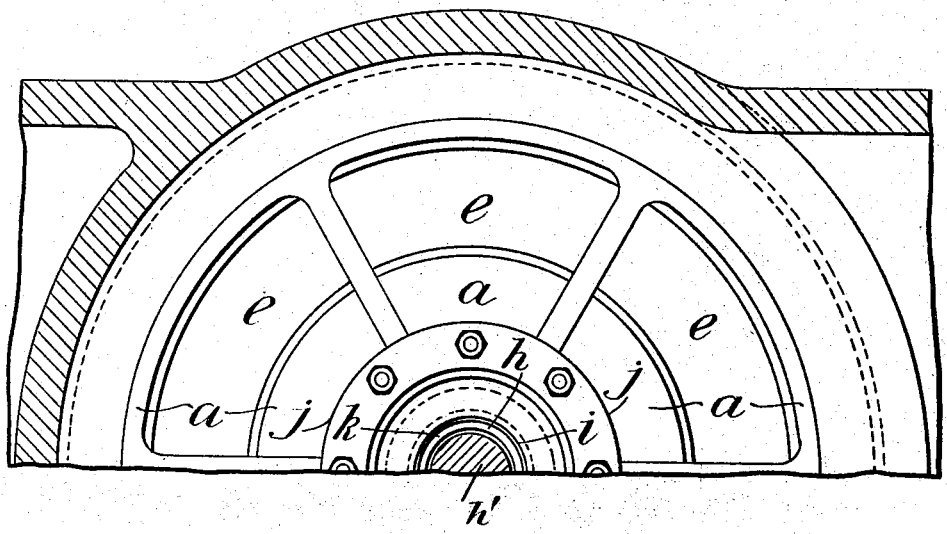

In order that others skilled in the art may understand our invention we have hereunto appended one sheet of illustrative drawings in which Figure 1 is a sectional elevation of part of a reducing valve constructed in accordance with our invention and Fig. 2 is an inverted plan of half of the valve corresponding to Fig. 1.

Referring to these drawings:—

In carrying our invention into effect or practice as applied to pressure reducing or like valves having two valve faces and two valve seats, the valve seating $a$ formed with the seats $b$, $c$ is formed with a bored center piece or sleeve $d$ which acts as a guide for the valve and provides a housing for the rod or valve stem $h'$. The valve $e$ having the faces $f$, $g$ is also formed with a pendent center piece or sleeve $h$ which fits within the guide $d$.

In order to overcome the difficulty heretofore experienced with this type of valve of preventing the leakage of pressure fluid between the central sleeve $h$ of the valve and the guide $d$, a flexible packing in the form of a thin flat ring $i$ of suitable metal such as sheet bronze is secured to a flange $j$ on the lower end of the guide $d$. In order to secure a fluid tight joint with the sleeve $h$ this has a rounded bead or rim $k$ formed on its lower end, and the ring $i$ constantly rests upon the rim $k$ being pressed against it by the greater pressure below the valve.

This arrangement of value is specially suitable for controlling fluid under pressure and has only a limited opening being formed with two faces and therefore capable of discharging fluid pressure at two orifices instead of one.

As the lift of the valve is very limited the end of the valve guide will always be in contact with the center part of flexible packing either when valve is open or shut.

What we claim and desire to secure by Letters Patent is:—

1. The combination of a structure having a valve seat and a tubular guide; a valve formed to coöperate with said seat and having an extension terminating in an annular face; with a flexible annular packing member loosely engaging said annular face and held against the same by pressure in said structure.

2. The combination of a structure having a valve seat and a tubular guide; a valve formed to coöperate with said seat and having a sleeve movable in said guide; a relatively thin flat ring fixed to one of the two parts comprised by the sleeve and the tubular guide and loosely held against the other of said parts by the pressure in said structure.

3. The combination of a structure having a valve seat and a flanged tubular guide; a valve formed to coöperate with said seat and having a sleeve longitudinally movable in said guide, the end of said sleeve adjacent the flange of the guide having an annular bead thereon; with a relatively thin flexible ring fixed to said flange and loosely engaging said bead under the action of fluid under pressure in the structure.

4. The combination of a valve casing; a seat structure mounted therein and having a flanged tubular guide mounted concentrically within it; a valve formed to coöperate with the seat of said structure and having a central extension slidable in the guide; with a relatively thin flexible ring fixed to the flange of said guide and loosely engaging the end of the extension of the valve.

In testimony whereof, we have signed our names to this specification, in the presence of two subscribing witnesses.

JOHN GRAHAM.
ARCHIBALD GRAHAM.

Witnesses:
R. C. THOMSON,
M. McKENZIE.

Copies of this patent may be obtained for five cents each, by addressing the "Commissioner of Patents, Washington, D. C."